United States Patent [19]

Meline

[11] Patent Number: 4,528,542

[45] Date of Patent: Jul. 9, 1985

[54] WATERPROOF STRAIN GAGE ELEMENT SYSTEM

[75] Inventor: Harry R. Meline, Minnetonka, Minn.

[73] Assignee: MTS Systems Corporation, Minneapolis, Minn.

[21] Appl. No.: 434,165

[22] Filed: Oct. 13, 1982

[51] Int. Cl.³ .............................................. G01L 1/22
[52] U.S. Cl. ........................................... 338/2; 338/6
[58] Field of Search .................... 338/2, 6; 33/147 D, 33/148 D, DIG. 13; 73/781, 768, 855; 177/211

[56] References Cited

U.S. PATENT DOCUMENTS

| | | | |
|---|---|---|---|
| 3,178,827 | 4/1965 | DeNicola | 73/781 X |
| 3,621,437 | 11/1971 | Mading | 338/6 X |
| 3,710,531 | 1/1973 | Bielawski | 174/DIG. 8 X |
| 3,891,790 | 6/1975 | Kierstead | 174/DIG. 8 |
| 4,042,049 | 8/1977 | Reichow et al. | 338/6 |

Primary Examiner—C. L. Albritton
Attorney, Agent, or Firm—Kinney & Lange

[57] ABSTRACT

A strain gage element system includes a spring flexure member on which strain gages of convention design are mounted, and a heat shrinkable waterproof tube that is placed over the gage and the support and shrunk into place. The spring flexure member is formed so that it has a substantially constant peripheral length about the perimeter of any cross-sectional plane perpendicular to the longitudinal axis of the spring flexure member. The heat shrinkable tube must be selected in size and shrinkage characteristics to tightly envelope and shrink against the gage and spring flexure member and seal the gage completely to prevent moisture of any kind from getting into contact with the gage.

4 Claims, 4 Drawing Figures

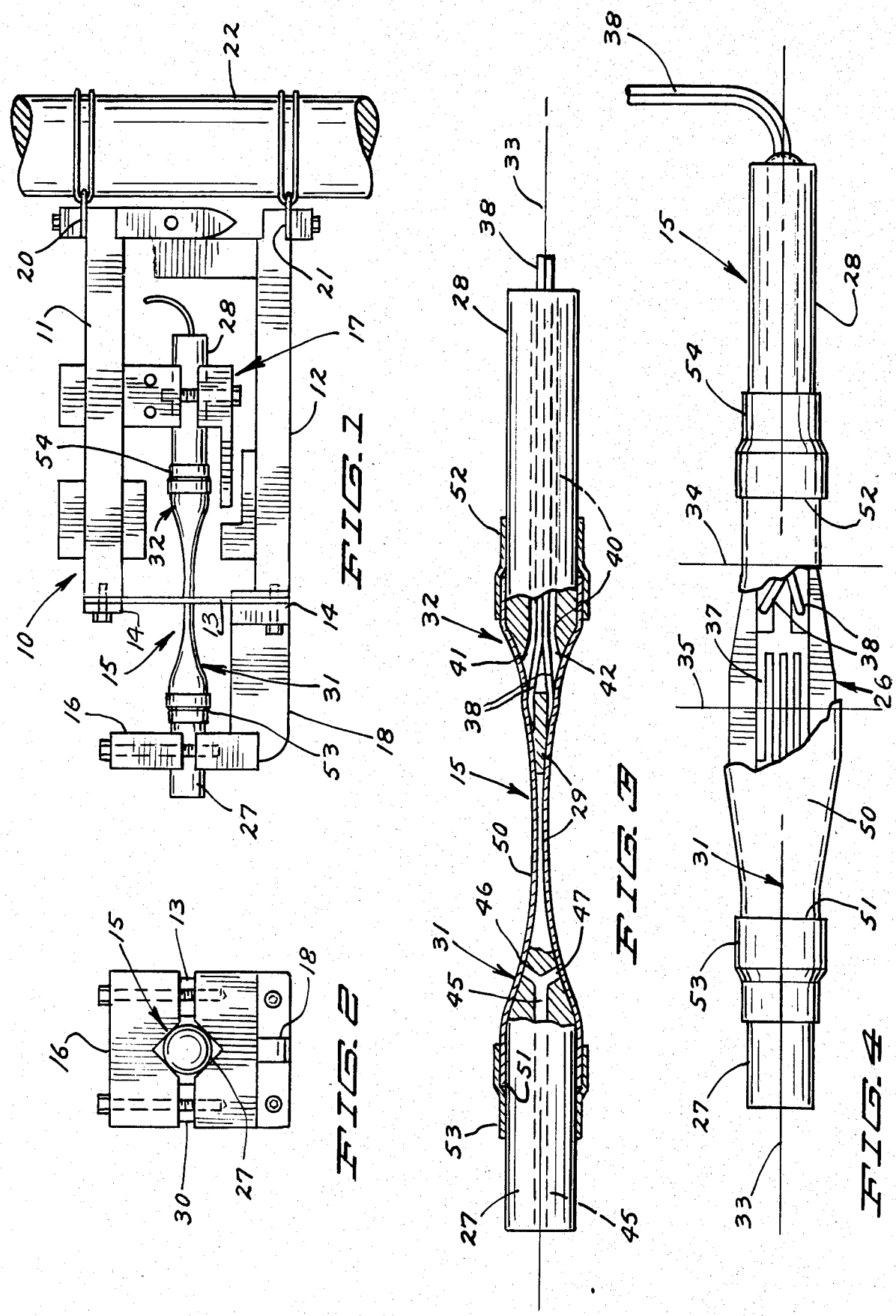

WATERPROOF STRAIN GAGE ELEMENT SYSTEM

BACKGROUND OF THE INVENTION

1. Field of the Invention

The present invention relates to a system used for waterproofing strain gage elements when in place on a member.

2. Description of the Prior Art

It has long been desired to have some way of sealing a strain gage when it's placed on a member that is to be loaded, such as a flexure member of an extensometer. Moisture problems are well known, and on bonded strain gages that are commonly used in many applications, high humidity, or operation when immersed in water, will cause resistance breakdown between the gage and its mounting. The drift of the gages also becomes impossible to compensate for in such situations.

Strain gages have a wide usage in a number of applications, and in particular a strain gage extensometer such as that shown in U.S. Pat. No. 3,789,508 has cross flexure elements supporting the arms of the extensometer with strain gages mounted on such flexure elements. The strain on the specimen with which the extensometer is used causes a movement of the arms and a bending or flexing of the flexure elements.

The specific usage shown herein is for this type of extensometer modified to accept a longer flexure element or spring and having the waterproofing system of the present invention incorporated thereon.

SUMMARY OF THE INVENTION

The present invention relates to a strain gage element system for use with extensometers, clip-on gages and other strain sensing devices that incorporates a waterproof cover so that it can operate in very high humidity or immersed in water. The waterproofing generally has to withstand a temperature range from about 40° to about 200° F. Essentially the strain gage mounting element comprises a spring flexure member or element on which one or more strain gages are mounted, which is preferably shaped along its longitudinal axis so that the peripheral distance around the periphery at any cross-sectional location along its longitudinal axis will be substantially the same. A "heat shrink" plastic tube is placed over the mounting element and the strain gages after the strain gages have been mounted and then the tube is heated to shrink tightly against the gages, the lead wires, and the spring flexure member on which the gages are mounted, to completely seal out any water.

If desired, the spring member can be made so that it can permit bleeding off of the air underneath the tube as the tube shrinks into place, and separate sealing cap members at opposite ends of the main heat-shrink tube can be used for insuring a tight seal at the ends.

In the form shown, the spring flexure member or element on which the gages are mounted has a generally flat section positioned between two mounting ends, which as shown are cylindrical, that are used for clamping the spring flexure member in position. The transition sections between the flat spring section on which the gages are mounted and the rounded ends are machined so that the peripheral distance of any cross section perpendicular to the axis is substantially the same. That means essentially that the center flat section, which is very thin, is also wider than the ends. When the peripheral or perimeter length of the cross section remains substantially the same, as the heat shrinkable tubing shrinks it will tighten down evenly throughout the length of the spring flexure member.

BRIEF DESCRIPTION OF THE DRAWINGS

FIG. 1 is a side elevational, part schematic view of a typical extensometer arrangement with which the strain gage element of the present invention is used;

FIG. 2 is an end view showing a typical mounting for the strain gage element of the present invention;

FIG. 3 is a sectional view of a strain gage element having a waterproofing system made according to the present invention installed; and FIG. 4 is a top plan view of the device in FIG. 3.

DETAILED DESCRIPTION OF THE PREFERRED EMBODIMENTS

In FIG. 1, a typical use for a waterproof strain gage element system made according to the present invention is shown. An extensometer 10 is formed substantially as that shown in U.S. Pat. No. 3,789,508 except that the length of the horizontal flexure element is increased to use the strain gage element system of the present invention. The extensometer 10 includes an upper arm assembly 11, and a lower arm assembly 12 which are connected together at the base end thereof by a first vertically extending pair of strips forming flexure elements 13 corresponding to the elements 13 in U.S. Pat. No. 3,789,508. The flexure elements 13 are thin strips of flexible spring material and provide an open center portion through which a waterproof strain gage element 15 extends.

A flexure elements 13 are clamped into position with blocks 14 that are held in place with suitable screws to clamp the ends of the elements 13 against the base ends of the arms 11 and 12. A first end of the strain gage element 15 is clamped with a clamp 16 at an outer end of an elongated support arm 18 in a suitable manner. The support arm 18 is attached to the lower block 14 which is fixed to the lower arm 12. The opposite end of the strain gage element 15 is connected through a clamp indicated at 17 to the upper arm 11, approximately in the midpoint of the arm 11 as shown.

In a normal manner, the outer ends of the arms 11 and 12 have knife-edged blades 20, and 21 mounted thereon which engage a test specimen 22 that is to be tested. The extensometer is held on the specimen in any desired manner, as shown, with elastic bands. The specimen 22 is to be tested under either tension or compression loading and thus the specimen 22 will either elongate or shorten under the load.

In order to measure the strain in the specimen 22, the change in spacing of the blades 20 and 21 is measured as the element 22 is loaded in known manner. In the present invention the strain gage element system 15 and the flexure element 13 will bend as the blades 20 and 21 move relative to each other.

The element system 15 is formed to waterproof the gage, and is shown in detail in FIGS. 3 and 4. The strain gage element system 15 includes spring flexure member 26, which has a first cylindrical end portion 27, a second cylindrical end portion 28, which is, as shown of greater longitudinal length than end portion 27, and between these cylindrical end portions the spring member 26 has a flat spring section 29. The spring flexure member 26 is made of a hardened material that forms a spring, such as beryllium copper. The flat spring section 29 is joined to the cylindrical end sections 27 and 28, with transition zone sections 31 and 32 which are tapered in direction perpendicular to the plane of flat spring section 29 and they also are tapered in lateral width. The transition zone sections 31 and 32 are reduced both in thickness or height, and in width in order to maintain a substantially constant peripheral distance or length for the perimeter of cross sections at any place along the longitudinal axis 33 of the spring flexure member.

A cross sectional plane, for example, along a cutting plane perpendicular to axis 33 at location shown generally by the line 34 would have the same distance around its periphery as around the periphery of the cross section at a cross section plane along line 35, right in the center portions of the flat spring section 29. The circumferential distance around the cylindrical end portions 27 and 28 will be the same as the peripheral distances around the cross sections at cutting planes 34 and 35.

Strain gages shown generally at 37 are mounted on the opposite planar surfaces of the flat spring section 29, and are bonded in place in a normal manner. The strain gages 37 have electrical leads 38 leading therefrom. In order to insure a tight fit of the covering material for waterproofing, as will be explained, these leads are passed into a central passageway or bore indicated at 40 extending through the end portion 28. The passageway 40 is joined by ports 41 and 42, respectively on the opposite surfaces of transition zone section 32 so that the leads 38 from each of the gages 37 on the opposite sides of the flat spring section 29 can be passed through the passageway 40. This arrangement leaves a very small irregularity on the surface of the transition section 32 from the leads.

Additionally, the end portion 27 has a passageway or hole 45 drilled therein along the longitudinal axis and has a pair of ports 46 and 47 that open to the opposite surfaces of the transition section 31, and also open to the passageway 45.

The waterproof strain gage element system comprises the use of a heat-shrinkable plastic tube indicated generally at 50, which is a selected size that will fit over the spring flexure member 26, and will also slip over the flat spring section 29. The tube 50 is selected in length so that its end portion overlap the cylindrical sections 27 and 28. The tube 50 does not terminate in the transition sections. Once the heat shrinkable plastic tube 50 is positioned, which is after the strain gages 37 have been bonded in place with the leads 38 extending out through the passageway 40, the heat shrinkable tube 50 is subjected to sufficient heat to cause it to shrink. This will tighten the tube 50 down onto the cylindrical end portions 27 and 28, and at the same time will cause the tube 50 to shrink against the surface of the transition sections 31 and 32 and tightly encompass and encircle the leads 38.

At the same time, any air that is present within the tube 50 and which might otherwise become trapped will be permitted to bleed out through the ports 41 and 42 and passageway 40, and or through the ports 46 and 47 through passageway 45. If desired, a vacuum could be applied through the passageways 45 and or 40.

The waterproofing process can end that stage, if the sealing or fitting of the ends of tube 50 on the cylindrical end portions, such as in portions 51 and 52, respectively, is watertight. However, to insure adequate sealing and waterproofing, auxilliary tube sections or caps 53 and 54, respectively, can be slid over the opposite end portions 51 and 52 of the tube 50 and also heat shrunk into place. This will form a double seal with the tube end caps 53 and 54 shrinking on the outer surface of the end portions of the tube 50 and also shrinking down onto and sealing on the surfaces of cylindrical members 27 and 28 very tightly to provide a complete seal even if there is a slight break in the seal at the end portions 51 and 52.

Once the assembly of plastic tubes has been shrunk into place as desired, either with only the tube 50 in place or with the tube end caps 53 and 54 in place, the openings 45 and 40 can be sealed with suitable sealing material such as epoxy or other sealing compound. The strain gages 37 on the flat spring section 29 are completely sealed. The waterproof tube 50 extends from one cylindrical end portion to the other.

Because peripheral distance of the cross sections along any cutting plane perpendicular to the longitudinal axis 33 is substantially equal, the tube 50 will shrink evenly and tightly onto the transition sections 31 and 32, the end portions 27 and 28, and also onto the flat spring section 29, to completely keep out moisture, whether from humidity or actual operation under water. Because the tube 50 will shrink in size equally and because the peripheral distance of the cross sections are substantially equal, the sealing will be complete.

The outer parts of end sections 27 and 28 are not covered by tube 50 and are used for clamping the strain gage element assembly 15, comprising the waterproof strain gage element system, into the clamps on the extensometer arms, or in place on a clip-on gage or other strain sensing instrument.

It should be noted that the cross sectional shape of the end portions 27 and 28 does not have to be circular as shown, and in certain instances, such as with a clip gage arm, a rectangular cross sectional shape can be utilized for clamping. The flexing element may then taper both in width and height to a center bending section where strain gages are mounted. Whether the cross sectional shapes are round, rectangular, or other shapes, the peripheral distance or size around the cross section is important. It is desirable to keep the peripheral distance uniform for most satisfactory operation.

The method of waterproofing a strain gage flexure element comprises providing a spring flexure member on which the strain gages will be mounted; mounting the gages in a flexing portion of the spring member; covering the gages with a tubing that is made of a heat shrinkable material throughout the entire length of the gages and for a desired distance beyond the ends of the gages; shrinking the tubing down onto the spring member and gages, until a tight, waterproof adherence is achieved between the inner surface of the tube and the surfaces of the spring member at the opposite ends of the strain gage. Optionally, the spring member can be made so that it has a substantially equal peripheral length about any cross section perpendicular to the longitudinal axis; providing means to permit air to bleed through the member from the interior when the tubing is heat shrunk into place; and heat shrinking separate tubular cap sections at the ends of the first mentioned tube for extra sealing of these ends.

The heat shrink tubing is well known in the art and can be selected so that the heat required for shrinking the tubing does not have to be high enough so that the gages are damaged. The size, including the diameter and wall thickness of the tubing can be selected to meet the existing conditions. The waterproof strain gage element system of the present invention may be used for any mounting member for strain gages where a tube can be slipped over the member.

The tubing can be selected in properties as to wall thickness and percent of shrink under heat to insure that the tube conforms to the shape of the bendable member throughout its length and is stretched to tightly adhere to the member it surrounds.

Although the present invention has been described with reference to preferred embodiments, workers skilled in the art will recognize that changes may be made in form and detail without departing from the spirit and scope of the invention.

What is claimed is:

1. A strain gage assembly comprising a spring flexure member having a longitudinal axis and an outer surface, at least one bonded strain gage bonded on said member to sense strain in said member, the flexure member having opposite end portions and a flat center portion on which the strain gage is bonded, the flat center portion having a thickness defined by first surfaces and a width transverse to the thickness which is substantially greater than its thickness, the opposite end portions being of a generally cylindrical cross section shape having a transverse dimension less than the width of the center portion and greater than the thickness of the center portion, the flexure member including transition sections between the end portions and flat center portion tapering from the width of the center portion inwardly toward the end portions, and from the first surfaces outwardly toward the end portions, respectively, so that the outer surface of the flexure member has a substantially uniform peripheral length at any cross section perpendicular to the longitudinal axis, and a heat shrinkable tube of substantially uniform initial internal diameter of size to slip over the flexure member and being of sufficient length along the longitudinal axis to extend beyond the opposite ends of said strain gage and onto the opposite end portions, said tube being shrunk to size so that the inner surfaces of said tube tightly adhere to the outer surfaces of the flexure member to fluidly seal the strain gage from the exterior.

2. The assembly as specified in claim 1 and cap means at opposite ends of said first mentioned heat shrinkable tube comprising a pair of tubular caps, each of said tubular caps being made of heat shrinkable tubing and each tubular cap having one end portion overlying one of the respective opposite ends of said first mentioned heat shrinkable tube and the opposite ends of each cap overlying a portion of the end portions, respectively, said tubular caps being shrunk to tightly adhere to the flexure member and the ends of the first mentioned heat shrinkable tube.

3. The assembly as specified in claim 1 wherein the strain gage has lead means extending therefrom, and at least one end portion of said flexure member having an aperture extending in direction of the longitudinal axis and having port means opening from said aperture to the exterior of the flexure member between the end portions of the flexure member whereby said lead means can pass through said port means and said aperture to the exterior of said flexure member, and means forming a waterproof seal for said aperture around said lead means at the respective end of said flexure member.

4. The assembly as specified in claim 3 and a second aperture formed in the second end portion of said flexture member, and a second port leading to the center portions of said flexure member from said second aperture to permit air to bleed from the interior of said heat shrinkable tube out through said second aperture as said heat shrinkable tube is shrunk onto the flexure member.

* * * * *

UNITED STATES PATENT AND TRADEMARK OFFICE
CERTIFICATE OF CORRECTION

PATENT NO. : 4,528,542
DATED : July 9, 1985
INVENTOR(S) : Harry R. Meline

It is certified that error appears in the above-identified patent and that said Letters Patent is hereby corrected as shown below:

In Claim 3, line 11, delete the word "flexture" and insert therefor --flexure--.

In Claim 4, lines 2-3, delete the word "flexture" and insert therefor --flexure--.

Signed and Sealed this

Nineteenth Day of July, 1988

Attest:

DONALD J. QUIGG

*Attesting Officer*  *Commissioner of Patents and Trademarks*